(12) United States Patent
Jing

(10) Patent No.: US 11,676,141 B2
(45) Date of Patent: Jun. 13, 2023

(54) BLOCK CHAIN-BASED ASSET PROCESSING METHOD, DEVICE, APPARATUS AND STORAGE MEDIUM

(71) Applicant: Baidu International Technology (Shenzhen) Co., Ltd., Shenzhen (CN)

(72) Inventor: Bo Jing, Shenzhen (CN)

(73) Assignee: Baidu International Technology (Shenzen) Co., Ltd., Shenzhen (CN)

( * ) Notice: Subject to any disclaimer, the term of this patent is extended or adjusted under 35 U.S.C. 154(b) by 258 days.

(21) Appl. No.: 17/115,891

(22) Filed: Dec. 9, 2020

(65) Prior Publication Data

US 2021/0312743 A1 Oct. 7, 2021

(30) Foreign Application Priority Data

Apr. 2, 2020 (CN) .......................... 202010256140.0

(51) Int. Cl.
  *G06Q 20/38* (2012.01)
  *G06Q 20/40* (2012.01)
  *G07C 13/00* (2006.01)

(52) U.S. Cl.
  CPC ..... *G06Q 20/3829* (2013.01); *G06Q 20/3825* (2013.01); *G06Q 20/3827* (2013.01); *G06Q 20/4014* (2013.01); *G07C 13/00* (2013.01); *G06Q 2220/00* (2013.01); *G06Q 2230/00* (2013.01)

(58) Field of Classification Search
  None
  See application file for complete search history.

(56) References Cited

U.S. PATENT DOCUMENTS 6,971,574 B1* 12/2005 Herskowitz ............ G06Q 50/26
  235/386
2002/0083126 A1* 6/2002 Best ....................... G07C 13/00
  709/203

(Continued)

FOREIGN PATENT DOCUMENTS

CN 106559387 A 4/2017
CN 107248074 A 10/2017

(Continued)

OTHER PUBLICATIONS

Aydara et al (Private key encryption and recovery in blockchain) (Year: 2020).*

(Continued)

*Primary Examiner* — Mamon Obeid
(74) *Attorney, Agent, or Firm* — Banner & Witcoff, Ltd.

(57) ABSTRACT

The present application discloses a block chain-based asset processing method, device, apparatus and storage medium, and relates to the technical field of block chain. The method includes: starting a voting on whether a target account is an account to be retrieved, in response to an asset retrieval transaction request of the target account for the account to be retrieved; performing an identity authentication on the target account, according to the votes of one or more target participants participating in one or more historical transactions initiated by the account to be retrieved; and processing the assets of the account to be retrieved, according to a result of the identity authentication of the target account.

16 Claims, 7 Drawing Sheets

(56) References Cited

U.S. PATENT DOCUMENTS

| | | | |
|---|---|---|---|
| 2004/0249817 A1* | 12/2004 | Liu | H04L 63/0435 |
| | | | 707/999.009 |
| 2008/0277470 A1* | 11/2008 | Gallaher | G07C 13/00 |
| | | | 235/386 |
| 2011/0078779 A1* | 3/2011 | Liu | G06F 21/6254 |
| | | | 726/28 |
| 2015/0269538 A1* | 9/2015 | Stanchfield | G06Q 20/3676 |
| | | | 705/71 |
| 2017/0061398 A1* | 3/2017 | Joseph | G06Q 20/3678 |
| 2017/0201577 A1* | 7/2017 | Wood | H04L 63/08 |
| 2018/0157839 A1* | 6/2018 | Pearson | G06F 21/602 |
| 2019/0007205 A1* | 1/2019 | Corduan | H04L 63/062 |
| 2019/0190724 A1* | 6/2019 | Sundaresan | H04L 9/3271 |
| 2020/0127835 A1* | 4/2020 | Fletcher | H04L 9/0637 |
| 2021/0312743 A1* | 10/2021 | Jing | G06Q 20/3823 |
| 2022/0060329 A1* | 2/2022 | Goguin | H04L 9/321 |
| 2022/0198864 A1* | 6/2022 | Ge | G06Q 50/265 |
| 2022/0224530 A1* | 7/2022 | Jeoung | H04L 63/126 |

FOREIGN PATENT DOCUMENTS

| | | | | |
|---|---|---|---|---|
| CN | 107347049 A | | 11/2017 | |
| CN | 107944255 A | | 4/2018 | |
| CN | 108898483 A | | 11/2018 | |
| CN | 109377358 A | | 2/2019 | |
| CN | 105681301 B | * | 3/2019 | G06F 21/33 |
| CN | 109560936 A | | 4/2019 | |
| CN | 110070363 A | | 7/2019 | |
| CN | 110741600 A | | 1/2020 | |
| CN | 111931195 A | * | 11/2020 | |
| JP | 2003067532 A | | 3/2003 | |
| JP | 2020035436 A | | 3/2020 | |
| KR | 20190115066 A | | 10/2019 | |
| KR | 20190137070 A | | 12/2019 | |
| WO | 2019043589 A1 | | 3/2019 | |
| WO | WO-2020029930 A1 | * | 2/2020 | G06Q 40/04 |

OTHER PUBLICATIONS

Wenzel Maira et al.: "Ensuring Data Integrity with Hash Codes / Microsoft Docs", https://docs.microsoft.com/, Nov. 23, 2018 (Nov. 23, 2018), pp. 1-4, XP055928618, Retrieved from the Internet: URL:https://web.archive.org/web/20181123142436/https://docs.microsoft.com/en-us/dotnet/standard/security/ensuring-data-integrity-with-hash-codes.

Zhu Yanlin et al: "A Proposal for Account Recovery in Decentralized Applications", 2019 IEEE International Conference on Blockchain (Blockchain), IEEE, Jul. 14, 2019 (Jul. 14, 2019), pp. 148-155, XP033682667, DOI: 10.1109/BLOCKCHAIN.2019.00028 [retrieved on Dec. 30, 2019].

Jan. 12, 2023—(KR) Office Action—App. No. 10-2021-0038005, pp. 1-13, w/ translation.

Feb. 24, 2023—(CN) Examination Report—App. No. 202010256140.0, pp. 1-8, w/ translation.

Feb. 25, 2023—(CN) Office Action—App. No. 202010256140.0, pp. 1-21, w/ translation.

Zhu Yan, et al., "Security Architecture and Key Technologies of Blockchain," Journal of Information Security Research, vol. 2, No. 12. Dec. 31, 216. pp. 1-8 w/ English translation.

* cited by examiner

BLOCK CHAIN-BASED ASSET PROCESSING METHOD, DEVICE, APPARATUS AND STORAGE MEDIUM

CROSS-REFERENCE TO RELATED APPLICATION

This application claims priority to Chinese patent application No. 202010256140.0, filed on Apr. 2, 2020, which is hereby incorporated by reference in its entirety.

TECHNICAL FIELD

The present application relates to the technical field of computer, especially to the technical field of block chain, and in particular to a block chain-based asset processing method, device, apparatus and storage medium.

BACKGROUND

With the development of block chain networks, the problems are emerging accordingly.

SUMMARY

The present application provides a block chain-based asset processing method, device, apparatus and storage medium.

According to a first aspect, a block chain-based asset processing method is provided, including:
  starting a voting on whether a target account is an account to be retrieved, in response to an asset retrieval transaction request of the target account for the account to be retrieved;
  performing an identity authentication on the target account, according to the votes of one or more target participants participating in one or more historical transactions initiated by the account to be retrieved; and
  processing the assets of the account to be retrieved, according to a result of the identity authentication of the target account.

According to a second aspect, a block chain-based asset processing device is provided, including:
  a voting module configured for starting a voting on whether a target account is an account to be retrieved, in response to an asset retrieval transaction request of the target account for the account to be retrieved;
  an identity authentication module configured for performing an identity authentication on the target account, according to the votes of one or more target participants participating in one or more historical transaction initiated by the account to be retrieved; and
  an asset processing module configured for processing the assets of the account to be retrieved, according to a result of the identity authentication of the target account.

According to a third aspect, an electronic apparatus is provided, including:
  at least one processor; and
  a memory communicatively connected with the at least one processor;
  wherein, the memory stores instructions executable by the at least one processor, the instructions being executed by the at least one processor to enable the at least one processor to perform the block chain-based asset processing method according to any embodiment of the present application.

According to a fourth aspect, a non-transitory computer-readable storage medium storing computer instructions is provided, wherein, the computer instructions cause the computer to perform the block chain-based asset processing method according to any embodiment of the present application.

It should be understood that the content in this section is not intended to identify key or critical features of the embodiments of the disclosure, nor is it intended to limit the scope of the disclosure. Other features of the present disclosure will become readily apparent from the following description.

BRIEF DESCRIPTION OF THE DRAWINGS

The drawings are included to provide a better understanding of the solution and are not to be construed as limiting the present application. In the drawings.

DETAILED DESCRIPTION

Exemplary embodiments of the present application are described below in conjunction with the accompanying drawings, which include various details of the embodiments of the present application to facilitate understanding, and should be considered as merely exemplary. Accordingly, one of the ordinary skills in the art should recognize that various changes and modifications can be made to the embodiments described herein without departing from the scope and spirit of the present application. Also, descriptions of well-known functions and structures are omitted from the following description for clarity and conciseness.

In a block chain-based network, when the private key of a user is lost, how to retrieve assets of that user is a problem necessary to be solved urgently. However, in related art, retrieval of the assets of the user is executed in a centralized manner, that is to say, not only it is executed in a complicated manner, but also its public credibility and efficiency are reduced.

The present application provides a block chain-based asset processing method, device, apparatus and storage medium, and the identity validity of the account is authenticated in the block chain network in a de-centralized manner.

Figure 1:
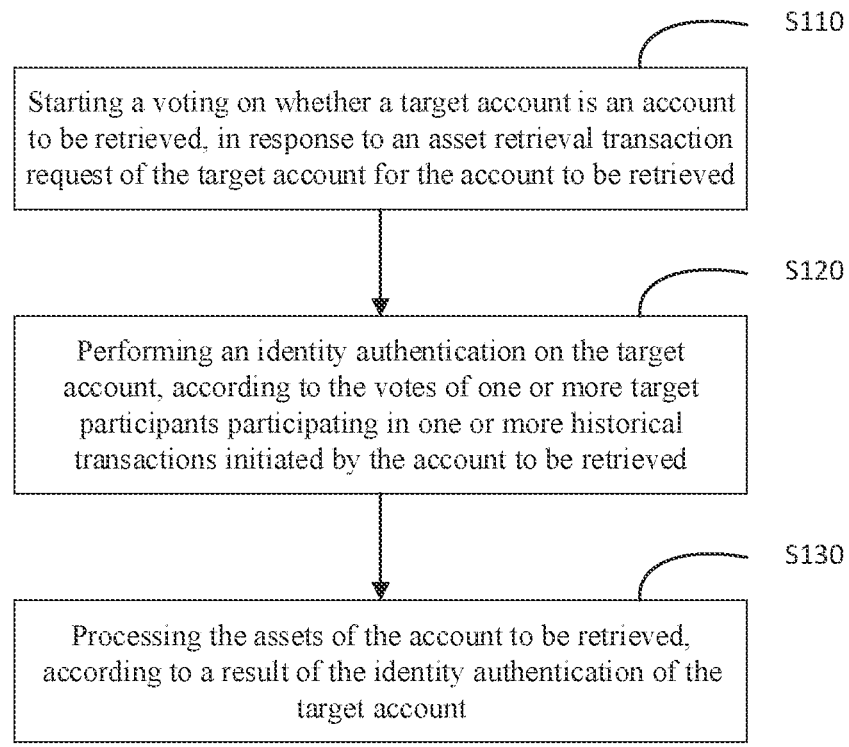
FIG. 1 is a flowchart of a block chain-based asset processing method according to a first embodiment of the present application.

FIG. 1 is a flowchart of a block chain-based asset processing method according to a first embodiment of the present application. The embodiment may be applicable to such a case that a block chain account is used to retrieve the asset in another account, such as an account whose private key is lost. The method may be performed by an asset retrieval intelligent contract which is deployed in a block chain node, and may be performed by a block chain-based asset processing device implemented in software and/or hardware, preferably configured in an electronic apparatus, such as an electronic apparatus to which the block chain node deployed with the asset retrieval intelligent contract belongs. As shown in FIG. 1, the method specifically may include S110, starting a voting on whether a target account is an account to be retrieved, in response to an asset retrieval transaction request of the target account for the account to be retrieved.

In an embodiment of the present application, an account to be retrieved may refer to a block chain account whose private key or asset is to be retrieved. A target account may refer to any block chain account in a block chain network that is different from the account to be retrieved, such as a real owner of the account to be retrieved or someone who steals assets maliciously. Exemplarily, when a private key of an account to be retrieved is lost, a real owner cannot control the account to be retrieved; at the moment, control right of the account to be retrieved can be retrieved by a target account based on the block chain network, and thus loss of assets in the account to be retrieved is avoided.

In this embodiment, an asset retrieval transaction request may refer to a transaction request used to initiate an asset retrieval in a block chain network. The asset retrieval transaction request is initiated by the target account. The initiation of the asset retrieval transaction request may be used for declaring that the target account is the owner of the account to be retrieved, may be used for acquiring the control right of the account to be retrieved, may be used for requesting the asset in the account to be retrieved to be transferred to the target account, and may also be used for triggering an intelligent contract to start a voting process so as to instruct the accounts in the block chain network to perform an identity authentication voting on whether the target account is the account to be retrieved.

In this embodiment, the vote is used for the block chain account to express approval or disapproval as to whether the target account is the account to be retrieved. The voting content of the accounts in the block chain network at least includes a vote option and a random number, and the vote option includes approval or disapproval. The account generates a hash value according to the voting content of the account itself and then uses the hash value for voting.

In the embodiment, the target account initiates an asset retrieval transaction request to the block chain network through the block chain node so as to recover the control right of the account to be retrieved. A node in the block chain network receives the asset retrieval transaction request, and calls the asset retrieval intelligent contract to respond to the asset retrieval transaction request. The asset retrieval intelligent contract is an executable program code which is deployed in each node in the block chain network and has a function of asset retrieval and belongs to a system-level intelligent contract.

Specifically, the asset retrieval intelligent contract starts the voting process. Correspondingly, when it is monitored that a voting process starts, an account in the block chain network may call for a voting function of the asset retrieval intelligent contract for performing a vote, by tracking the intelligent contract and/or by tracking the target account which initiates the asset retrieval transaction request.

Before the voting on whether the target account is the account to be retrieved is started, a in the target account may be transferred to a contract account so as to freeze the preset amount of assets. The frozen assets can be used for a asset award distribution on voters who participate in a valid vote so as to encourage the accounts in the block chain network to actively monitor and participate in voting, and encourage the accounts in the block chain network to carry out a true and valid vote. Correspondingly, if it is detected that the amount of assets in the target account is less than a predetermined amount, the asset retrieval transaction request of the target account under the condition of insufficient assets may not be responded in order to avoid the attack of a malicious account on the account to be retrieved.

In addition, during the voting process, if an intervention account calls the declaration function of the asset retrieval intelligent contract, to initiate an identity declaration transaction to the block chain network for declaring itself to be the real owner of the account to be retrieved, the asset retrieval intelligent contract may perform an identity authentication on a signature of the intervention account, according to the public key of the account to be retrieved; and under the condition that the authentication is successful, determine that the intervention account is a real owner of the account to be retrieved, and timely terminates the voting process on whether the target account is the account to be retrieved.

S120, performing an identity authentication on the target account, according to the votes of one or more target participants participating in one or more historical transactions initiated by the account to be retrieved.

In an embodiment of the present application, a target participant may refer to a block chain account participating in any historical transaction initiated by the account to be retrieved, such as a recipient of a transfer transaction or an interaction side of information transfer, etc. Since the target participant undergoes an interaction with the account to be retrieved, the target participant has a certain knowledge about the account to be retrieved, and can distinguish whether the target account is the account to be retrieved based on the knowledge, and thus the vote may have a certain credibility.

In this embodiment, the identity authentication may refer to authenticate whether the target account is the account to be retrieved based on the votes of target participants. In a case of ensuring sufficient voting quantity, the vote is counted by adopting a certain voting statistical mode, and the target account is authenticated on the basis of the majority rule. The results of identity authentication may be divided into an approval of the target account being the account to be retrieved, and a disapproval of the target account being the account to be retrieved, and no conclusion due to insufficient target participants.

Specifically, based on the traceability of the transaction data in the block chain, one or more block chain accounts participating in one or more historical transactions initiated by the account to be retrieved can be determined as target participants, according to the historical transaction data stored in the block chain. The voting rights can be allocated to the target participants, and only the target participants have a voting right, and accordingly only the votes of the target participants can be received. Alternatively, the vote of any one of block chain accounts may be received, and identity authentication will be performed on every voter to filter out a vote of a target participant from all of the votes.

Therefore, on the basis of the votes of the respective target participants, an identity approval score and an identity disapproval score are determined based on a certain voting statistical mode, and the identity authentication result is determined according to the identity approval score and the identity disapproval score. The present embodiment does not limit the voting statistical mode, and any manner in which the votes can be counted can be applied to the present embodiment. For example, the number of approval or disapproval votes may be accumulated directly, or a weight may be determined for each target participant, based on the principle that the closer the historical transaction processing time is to the current time, the greater the credibility of the vote is, so that the votes are counted based on the weights, etc.

If a block chain account performs voting by using a hash value of the voting content, the voting content published by the block chain account to the block chain network can be obtained at the end of the voting, a hash value is newly calculated based on the published voting content, and the vote is verified by comparing the newly calculated hash value with the hash value in the voting, so that the identity authentication is performed on the target account based on the vote verified to be valid.

S130, processing the assets of the account to be retrieved according to the identity authentication result of the target account.

In an embodiment of the application, if the identity authentication result is approval of the target account being the account to be retrieved, the asset retrieval intelligent contract executes an asset transfer operation to transfer the assets in the account to be retrieved to the target account. If the identity authentication result is disapproval of the target account being the account to be retrieved or is inconclusive (no conclusion), the asset retrieval intelligent contract does not execute the asset transfer operation. When the target account is authenticated to be the owner of the account to be retrieved, all assets in the account to be retrieved are transferred to the target account, so that the account to be retrieved with the private key lost is retrieved, and the security and traceability of the assets in the account to be retrieved are guaranteed.

Among them, the asset processing for the account is not limited to the processing of the account to be retrieved, but may also include an asset freezing process for the target account, an asset award distribution process for a voter based on frozen assets, etc. Exemplarily, regardless of the identity authentication result, the frozen assets of the target account may be used for performing an asset award distribution on a voter to which the vote being verified to be valid belongs. Alternatively, when an intervention account exists and the intervention account is authenticated to be the real owner of the account to be retrieved, a portion of the frozen assets in the target account is transferred into the intervention account as a compensation, and the other portion of the frozen assets of the target account is used to perform the asset award distribution on the voter to which the vote being verified to be valid belongs.

According to the embodiment, the intelligent contract starts a voting process on whether the target account is the account to be retrieved, in response to an asset retrieval transaction request of the target account for the account to be retrieved; determines a target participant of a historical transaction initiated by the account to be retrieved, and performs an identity authentication on the target account according to the vote of the target participant; and thereby processes the assets of the account to be retrieved according to the identity authentication result. According to the embodiment of the present application, the account having a historical transaction processing relationship with the account to be retrieved is used for carrying out an identity authentication on the target account in a manner of voting, so that the identity validity of the account is authenticated in a block chain network in a de-centralized manner, and the retrieval of the assets in the account based on the block chain network is facilitated when the private key of the account is lost, and the public credibility, the usability, the authentication efficiency and the accuracy rate of the identity authentication are improved during the asset retrieval.

Through the technical solutions provided in the present application, the identity validity of the account is authenticated in the block chain network in a de-centralized manner, the retrieval of the assets in the account based on the block chain network is facilitated when the private key of the account is lost, and the public credibility, the usability, the authentication efficiency and the accuracy rate of the identity authentication are improved during the asset retrieval.

Figure 2:
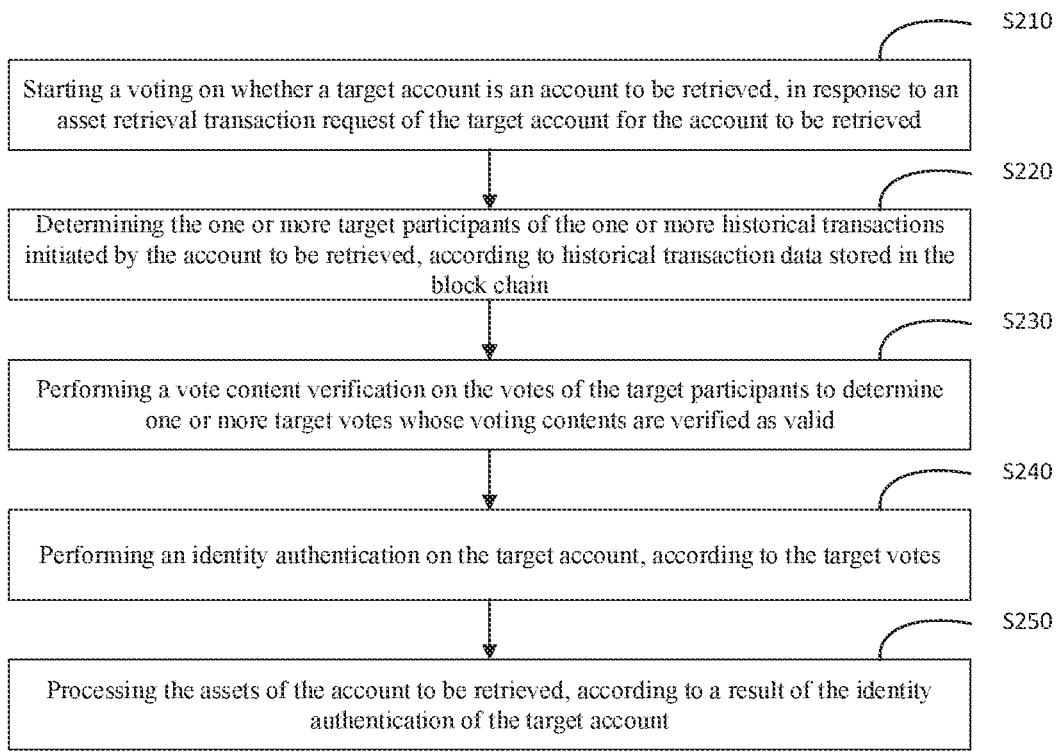
FIG. 2 is a flowchart of a block chain-based asset processing method according to a second embodiment of the present application.

FIG. 2 is a flowchart of a block chain-based asset processing method according to a second embodiment of the present application. The second embodiment enables a voting content verification on the vote of a target participant, and performs an identity authentication on a target account according to a verified valid target vote by further explaining the identity authentication of a target account based on the vote of a target participant to a historical transaction initiated by an account to be retrieved, on the basis of the first embodiment described above. As shown in FIG. 2, the method may include:

S210, starting a voting on whether a target account is an account to be retrieved in response to an asset retrieval transaction request of the target account for the account to be retrieved.

S220, determining the one or more target participants of one or more historical transactions initiated by the account to be retrieved, according to historical transaction data stored in the block chain.

In an embodiment of the present application, based on the traceability of transaction data in the block chain, a block chain account participating in any historical transaction initiated by an account to be retrieved, or other participating accounts in any historical transaction in which the account to be retrieved participates, may be determined as a target participant, according to the historical transaction data stored in the block chain. For example, the target participant is a recipient of a transfer transaction or an interaction side of information transfer, etc.

S230, performing a voting content verification on the votes of the one or more target participants to determine one or more target votes whose voting contents are verified as valid.

In an embodiment of the present application, after the asset retrieval intelligent contract determines the target participant, a voting right can be allocated for the target participant, and only the target participant has the voting right, and accordingly only the vote of the target participant can be received. Alternatively, the vote of any block chain account may be received, and identity authentication is performed to the voters so as to filter out the vote of the target participant from all votes.

In the embodiment, voting content in the vote will be unknown in the block chain network, in view of the voting being carried out in a blind mode, that is, the block chain account carries out the voting by using the hash value. Therefore, in a case that the vote is finished, namely without influencing the vote of other accounts, the block chain account publishes the voting content of the block chain account to the block chain network. Among other things, in order to prevent an individual account, during the publishing process, from changing its voting content through following other voting content to get awards, it is necessary to verify the voting content before counting the votes.

Specifically, a specific flow of voting content verification may include:

A. obtaining a first hash value generated by the target participant based on a vote option and a random number.

In this embodiment, the vote option is a voting opinion of the block chain account for the target account identity, including an approval or an disapproval. The random number is a number randomly generated when the block chain account calls a voting function of an asset intelligent contract for voting. The first hash value is a hash value generated according to the vote option and the random number when the block chain account calls the voting function of the asset intelligent contract for voting. Specifically, the block chain account votes using the first hash value. Accordingly, the intelligent contract obtains the first hash value from the vote, after receiving the vote of the target participant.

B, in a case that it is monitored that a voting time limit is arrived, obtaining the vote option and the random number published in the block chain network by a target participant.

In this embodiment, the voting time limit may refer to the total duration of the pre-specified voting process in the asset retrieval intelligent contract. Specifically, since the voting process is started, when the arrival of the voting time limit is monitored, the target participant publishes its own vote option and random number in the block chain network. Accordingly, the intelligent contract obtains the vote option and the random number published by the target participant. The allocation of the voting time limit not only limits the voting time, but also clearly divides the voting process and the publishing process so as to avoid the influence on voting content of the non-voting account caused by publishing the voting content in a voting process.

C, generating a second hash value according to the vote option and the random number published in the block chain network by the target participant.

In the embodiment, the second hash value may refer to a hash value which is generated by the asset retrieval intelligent contract through a recalculation according to the published vote option and the random number, after the voting process is finished and the target participant has published the voting content. Here, the wordings of "first" and "second" relating to hash values are just used to distinguish the hash values generated at different stages, and they have not any substantial difference therebetween.

D, determining the vote whose first hash value and second hash value are the same, as a target vote whose voting content is verified as valid.

In the embodiment, the first hash value may refer to the hash value during the voting process, and the second hash value may refer to the hash value recalculated by the asset retrieval intelligent contract. The target vote may refer to a vote whose first hash value and second hash value are the same.

Specifically, the asset retrieval intelligent contract compares the first hash value with the second hash value. If the first hash value is the same as the second hash value, it indicates that the block chain account does not follow or refer to other voting content to modify its own voting content during publishing the voting content, i.e. the published voting content is consistent with the voting content during the voting process. Such a vote is thus determined as a valid target vote being verified.

Due to the fact that the target participants vote by using the respective first hash values, their voting contents cannot be known by others. When a voting is finished, that is, when the voting content cannot be modified, the number of votes is counted according to the voting contents published by the target participants. In order to prevent the target participants from modifying their voting contents according to voting contents of other accounts during the publishing of their voting contents, the truth and reliability of the voting contents are guaranteed by recalculating hash values of the voting contents and conducting comparison on two hash values of each of the respective voting contents.

S240, performing an identity authentication on the target account, according to the one or more target votes.

In an embodiment of the present application, since a target vote is a vote whose voting content is verified to be valid, the votes are counted in a certain voting statistical mode on the basis of the target vote, and identity authentication is performed on the target account on the basis of a rule which specified that the majority one among the voting results to be the final voting result.

Specifically, a specific process for authenticating the identity of the target user may include:

A, determining the weights of the respective target participants, according to a historical transaction processing time by each of the target participants and the account to be retrieved.

In this embodiment, a historical transaction processing time may refer to the historical time when a target participant participates in the same transaction together with the account to be retrieved. It will be appreciated that the closer the historical transaction processing time is to the current time, the clearer the information that the target participant knows about the account to be retrieved is and the closer to the current real situation. Thus, a weight may be determined for each of the target participants based on the principle that the closer the historical transaction processing time is to the current time, the greater the credibility of the vote is.

Specifically, firstly, the historical transaction processing time of a target participant and the account to be retrieved is determined according to the transaction data stored in the block chain network; secondly, a time difference between the historical transaction processing time and the current time is determined; and finally, the weight of each of the target participants is determined according to the time difference based on a certain weight setting rule, namely, the smaller the time difference is, the larger the weight is. Here, the present embodiment does not limit the weight setting rule, and any manner in which the weight can be set based on the principle that the smaller the time difference is, the larger the weight is, can be applied to an embodiment of the present application.

Exemplarily, time differences of the respective target participants are ordered, in an order from smallest to largest, and the distance parameters thereof, denoted with DISTANCE, are sequentially assigned with the numerical values of 1, 2, 3, etc. For example, the target participant with the smallest time difference is assigned with a distance parameter, DISTANCE, of 1, the target participant with the second smallest time difference is assigned with a distance parameter, DISTANCE, of 2, and so on. The weights thereof, denoted with WEIGHT, may then be calculated as WEIGHT=1/DISTANCE, or WEIGHT=1/log (N+DISTANCE), where N is a constant.

B, determining an identity approval score and an identity disapproval score, according to the vote options in the respective target votes and the weights of the respective target participants.

In the embodiment, the weights of the respective target participants to which the target votes with a same vote option belong can be summed, according to the respective vote options, to obtain the score of the vote option. For example, the weights of the target participants to which all the target votes with the vote option of approval belong are summed to obtain an identity approval score; and the weights of the target participants to which all the target votes with the vote option of disapproval belong are summed to obtain an identity disapproval score.

C, determining a result of the identity authentication of the target account, according to the identity approval score, the identity disapproval score and a lowest score set for voting.

In this embodiment, the lowest score may refer to a minimum score value predetermined in the asset retrieval intelligent contract. The specific numerical value of the lowest score may be set based on a weight setting rule. The lowest score typically may not change as the number of target participants changes, e.g., the requirement cannot be lowered as the number of target participants decreases.

In the embodiment, the identity authentication result is determined by comparing the identity approval score with the identity disapproval score, and whether the identity authentication result is valid is determined by comparing the identity approval score or the identity disapproval score with the lowest score.

As the closer a historical transaction is to the current time, the clearer the identity information that the target participant knows about the account to be retrieved and the more it is consistent with the current actual situation, different weights may be set for different target participants according to the historical transaction processing time. Therefore, voting statistics is carried out based on the weights and the vote options, so that the contributions of different target participants to the identity authentication are different, which can improve the accuracy of voting statistics and further enhance the accuracy of identity authentication.

Exemplarily, if it is detected that the identity approval score is greater than the identity disapproval score and the identity approval score is greater than the lowest score, it may be determined that the identity authentication result is approval of the target account being the account to be retrieved. If it is detected that the identity approval score is less than the identity disapproval score and the identity disapproval score is greater than the lowest score, it may be determined that the identity authentication result is disapproval of the target account being the account to be retrieved. If it is detected that the larger one of the identity approval score and the identity disapproval score is less than the lowest score, it may be determined that the identity authentication result is inconclusive.

By setting the lowest score, the inaccuracy of voting statistics caused by insufficient number of target participants may be prevented, the accuracy of voting statistics is improved, and the accuracy of identity authentication is further increased.

S250, processing the assets of the account to be retrieved according to the identity authentication result of the target account.

Figure 3:
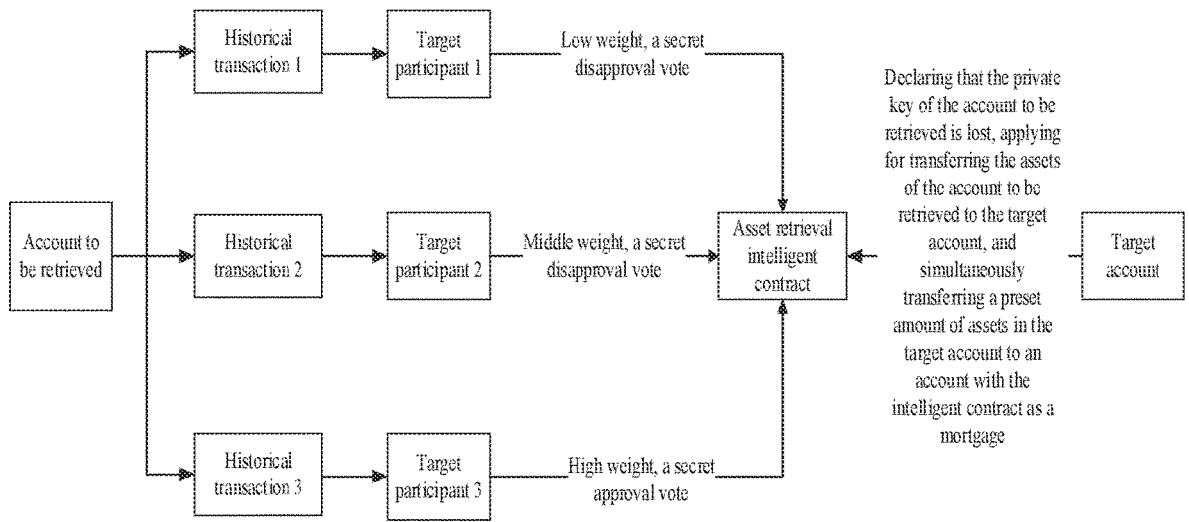
FIG. 3 is an exemplary diagram of block chain-based asset processing according to the second embodiment of the present application.

Exemplarily, FIG. 3 is an exemplary diagram of block chain-based asset processing. As shown in FIG. 3, a target account initiates an asset retrieval transaction request to declare that the private key of the account to be retrieved is lost, applies for transferring the assets of the account to be retrieved to the target account, and simultaneously transfers a preset amount of the assets in the target account to the intelligent contract account as a mortgage. The asset retrieval intelligent contract responds to an asset retrieval transaction request, starts a voting process, and receives the votes of one or more target participants of historical transactions initiated by the account to be retrieved. Correspondingly, the asset retrieval intelligent contract sets the weights for the one or more target participants, and performs an identity authentication on the target account according to the weights and the secret vote options. As shown in FIG. 3, although both the target participant 1 and the target participant 2 conduct the voting with disapproval, and only the target participant 3 conduct the voting with disapproval, i.e., the number of disapproval for voting being larger. However, the target participant 1 has a lower weight, and the target participant 2 has a middle weight, while the target participant 3 has a higher weight. Therefore, the identity authentication result is obtained after performing the voting statistics, and the obtained identity authentication result might be subverted to be approval.

According to the technical solution of the embodiment, by verifying the voting contents of the target participants and carrying out the identity authentication based on the votes verified to be valid, and thus a target participant is prevented from following other voting content for benefits, which can guarantee truth and reliability of the voting contents, and can also further improve the accuracy of identity authentication.

Figure 4:
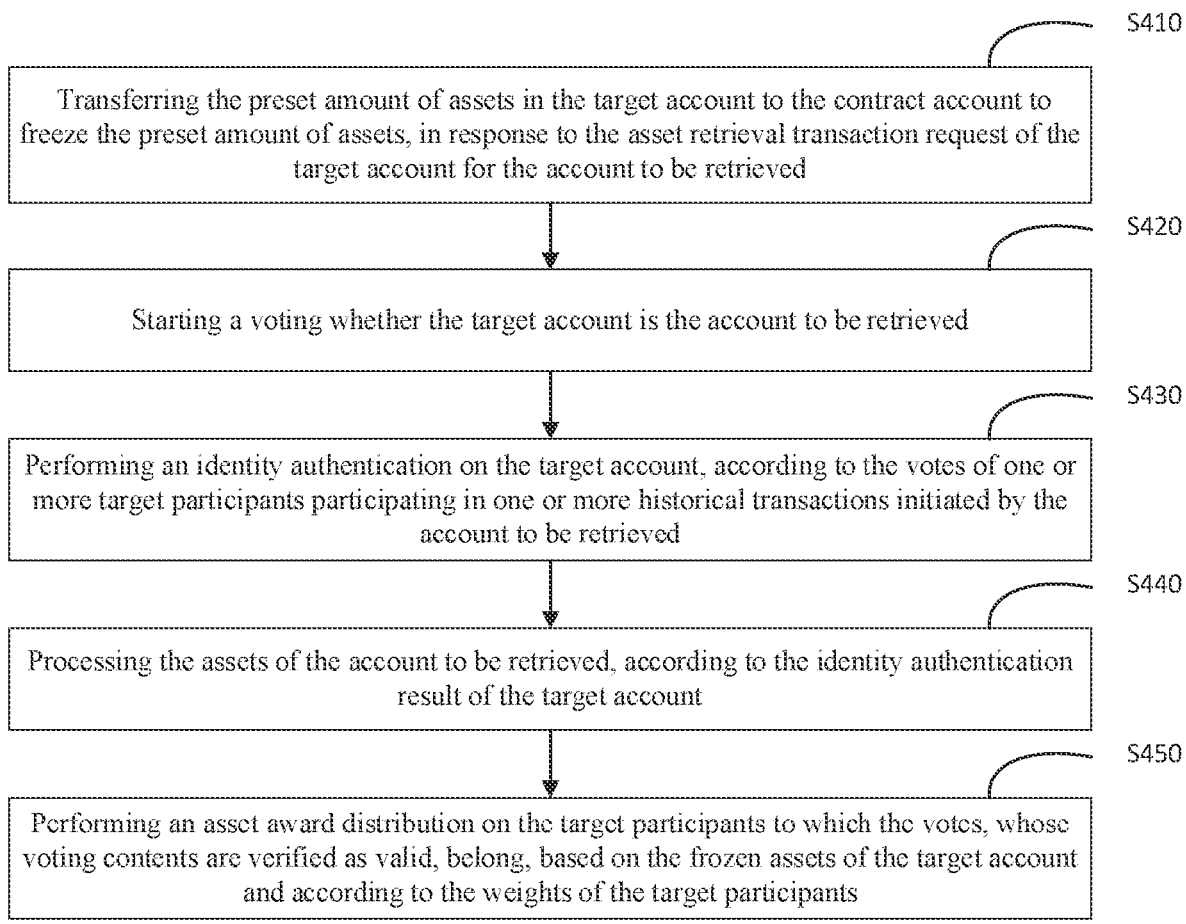
FIG. 4 is a flowchart of a block chain-based asset processing method according to a third embodiment of the present application.

FIG. 4 is a flowchart of a block chain-based asset processing method according to a third embodiment of the present application. The third embodiment further explains the processing of assets on the basis of the first embodiment described above, wherein, an asset award distribution is performed on the target participants to which the votes with their voting contents verified to be valid belongs based on the frozen assets of the target account. As shown in FIG. 4, the method may include:

S410, transferring a preset amount of assets in the target account to a contract account to freeze the preset amount of assets, in response to an asset retrieval transaction request of the target account for the account to be retrieved.

In a specific embodiment of the application, the contract account may refer to an account of the asset retrieval intelligent contract for freezing or mortgaging assets of the block chain account. In the embodiment, there is no limitation to the term "a/the preset amount", and any value which may bring a deterrent force or a certain loss may be applied to the embodiment, so that any arbitrary retrieval operation of a malicious account may be avoided.

Specifically, in response to an asset retrieval transaction request of the target account for the account to be retrieved, before the voting on whether the target account is the account to be retrieved is started, a preset amount of assets in target account is preferably transferred to a contract account for freezing or mortgaging partial assets of the target account. By carrying out the asset freezing of the target account, the target account pays a certain cost for asset retrieval, and thus any arbitrary retrieval of assets by malicious accounts is avoided, and the security of asset retrieval is improved. Meanwhile, an asset award distribution can be used for voters having performed valid voting so as to encourage the accounts in the block chain network to actively monitor and participate in voting, and encourage the accounts in the block chain network to carry out a true and valid vote.

S420, starting a voting on whether the target account is the account to be retrieved.

S430, performing an identity authentication on the target account according to the votes of the target participants of historical transactions initiated by the account to be retrieved.

S440, processing the assets of the account to be retrieved according to the identity authentication result of the target account.

S450, performing an asset award distribution on the target participants to which the votes with their voting contents verified to be valid belongs, based on the frozen assets of the target account and according to the weights of the target participants.

In an embodiment of the present application, during the stage of voting statistics, the asset retrieval intelligent contract determines the weight for each of the target participants based on the principle that the closer the historical transaction processing time is to the current time, the greater the credibility of the corresponding vote is. Also during the stage of voting statistics, the asset retrieval intelligent contract determines a vote with the same two hash values (preceding hash value and subsequent hash value) as a valid vote whose voting content is verified to be valid, according to the hash value in the vote (the preceding hash value) and the hash value recalculated based on the voting content published by the target participant (the subsequent hash value).

In the embodiment, whether the identity authentication result is approval or disapproval, the frozen assets of the target account may be used for performing an asset award distribution on the voters to which the votes verified to be valid belong. Specifically, the award share of a voter to which each vote verified to be valid belongs may be determined according to the following formula: the award share of the voter to which each vote verified to be valid belongs=the weight of the voter/total weight×total frozen assets. The total weight may refer to the sum of the weights of the voters to which all votes verified to be valid belong, that is to say, the votes verified to be invalid are not considered therein.

Figure 5:
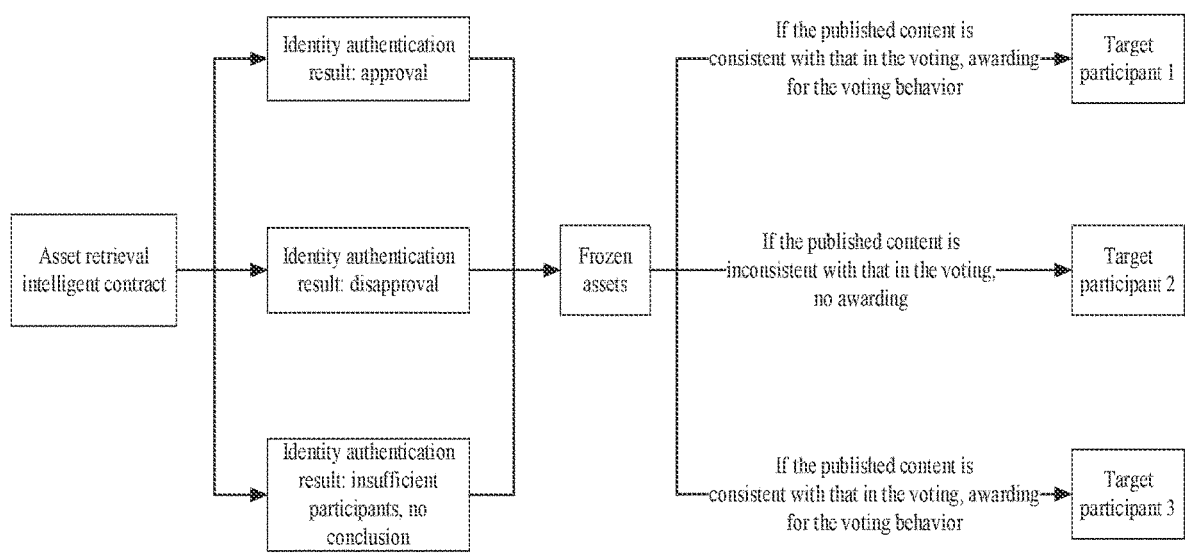
FIG. 5 is another exemplary diagram of block chain-based asset processing according to a third embodiment of the present application.

Exemplarily, FIG. 5 is another exemplary diagram of block chain-based asset processing. As shown in FIG. 5, whether the identity authentication result is approval or disapproval, the frozen assets of the target account may be used for performing an asset award distribution on a voter to which a vote verified to be valid belongs. That is, a voting behavior award is given to a target participant for which the published voting content is verified to be consistent with the voting content in the voting. Some target participants for which the published voting contents are verified to be inconsistent with the voting contents in the voting are not awarded because they have a suspect of following other voting content.

According to the technical solution of the embodiment, with respect to the frozen assets of the target account, the asset award distribution is carried out on the target participants to which the votes with their voting contents verified to be valid belong, so that the target account pays a certain cost for the retrieval of the assets, and thus any arbitrary retrieval of the assets by a malicious account is avoided, the tracking of the voting process by the block chain account and the correct voting of the target account are stimulated, and the accuracy of identity authentication is improved.

Figure 6:
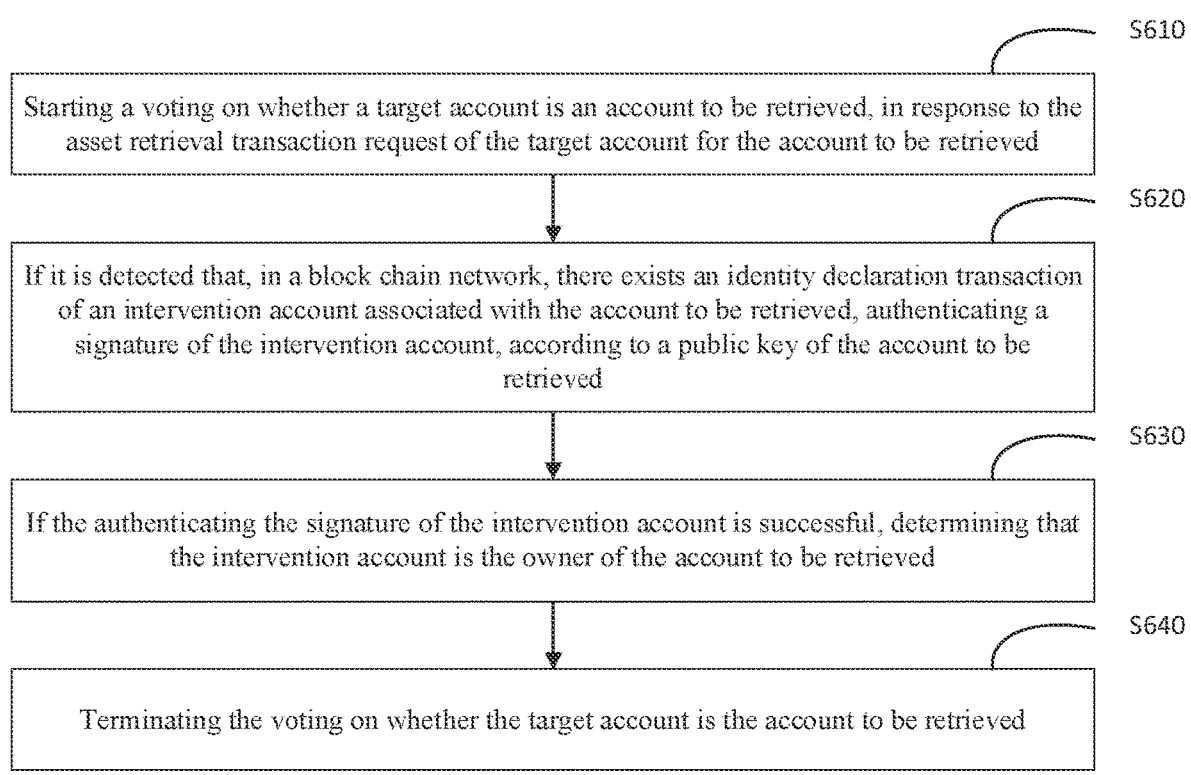
FIG. 6 is a flowchart of a block chain-based asset processing method according to a fourth embodiment of the present application.

FIG. 6 is a flowchart of a block chain-based asset processing method according to a fourth embodiment of the present application. The fourth embodiment further explains a voting process based on the first embodiment described above, and can terminate the voting process when a real owner of the account to be retrieved is detected in the voting process. As shown in FIG. 6, the method may include:

S610, starting a voting whether a target account is an account to be retrieved in response to an asset retrieval transaction request of the target account for the account to be retrieved.

S620, if it is detected that an identity declaration transaction of an intervention account to the account to be retrieved exists in the block chain network, authenticating a signature of the intervention account according to a public key of the account to be retrieved.

In an embodiment of the present application, the identity declaration transaction may refer to a transaction used to declare in a block chain network that the initiator is the owner of the account to be retrieved. The intervention account may refer to a block chain account that initiates an identity declaration transaction during the voting, which may or may not be the real owner of the account to be retrieved.

Specifically, during the voting process, the intervention account can call an declaration function of the asset retrieval intelligent contract, and use the private key of the intervention account for signing to initiate the identity declaration transaction to the block chain network. Correspondingly, the asset retrieval intelligent contract authenticates the signature of the intervention account by using the public key of the account to be retrieved, based on a conventional signature authentication process.

S630, if the signature authentication of the intervention account is successful, determining that the intervention account is the owner of the account to be retrieved.

In an embodiment of the present application, since the intelligent contract uses the public key of the account to be retrieved to perform a signature authentication, if the signature authentication is successful, it indicates that the private key of the intervention account is the private key of the account to be retrieved, i.e. the private key of the account to be retrieved is not lost, and then the intervention account is determined to be the owner of the account to be retrieved. Or else, the intervention account is not the owner of the account to be retrieved.

S640, terminating the voting on whether the target account is the account to be retrieved.

In an embodiment of the present application, when it is determined that the real owner of the account to be retrieved exists and the account to be retrieved is not the target account, it means that there exists the behavior that the target account steals maliciously the assets of the account to be retrieved, so that the asset retrieval intelligent contract may terminate the voting process timely so as to avoid the waste of network resources of the block chain.

In addition, if partial asset freezing is performed on the target account in response to the asset retrieval transaction request, the frozen assets of the target account can be used to transfer a part of the frozen assets to the intervention account, and the remaining part of the frozen assets are used to perform an asset award distribution on the voters to which the votes verified to be valid belong so as to compensate the intervention account and the voters to which the votes verified to be valid belong and punish the target account.

According to the technical solution of the embodiment, the real owner of the account to be retrieved is identified in the voting process by performing the signature authentication on the intervention account initiating the identity declaration transaction, so that the asset stealing behavior of the malicious account is timely terminated, and the security of the account to be retrieved is guaranteed.

Figure 7:
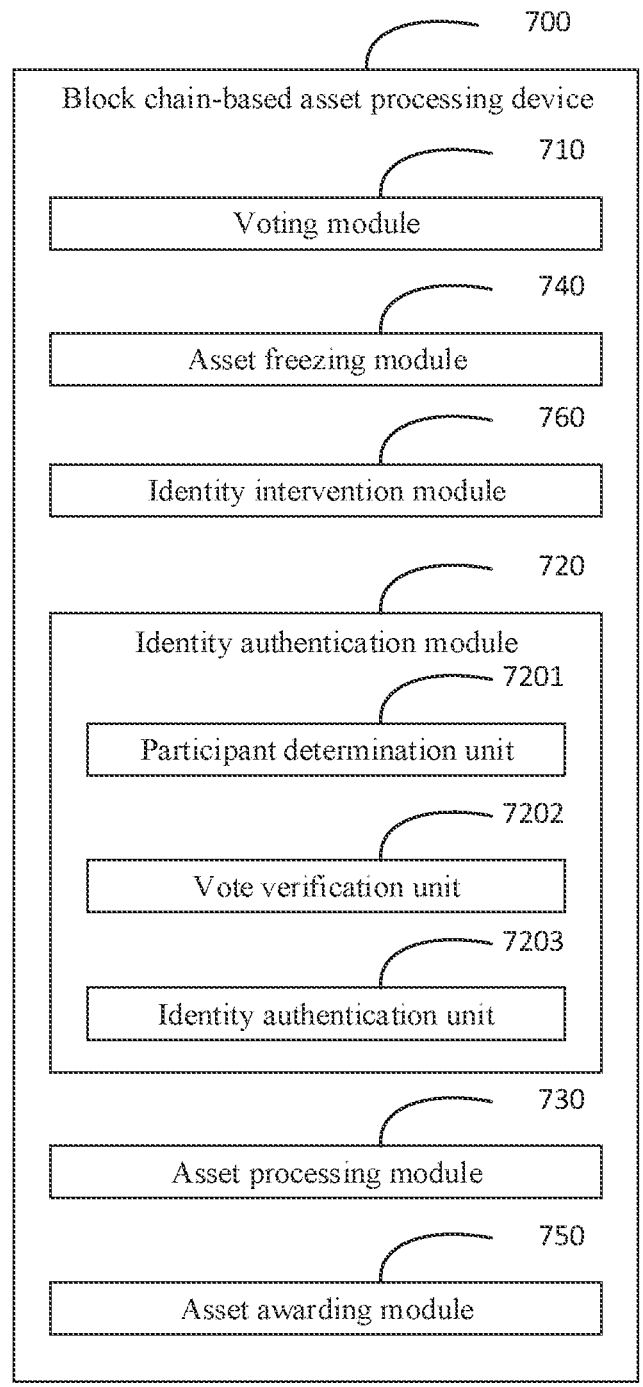
FIG. 7 is a structure diagram of a block chain-based asset processing device according to a fifth embodiment of the present application.

FIG. 7 is a structure diagram of a block chain-based asset processing device according to a fifth embodiment of the present application. The embodiment is applicable to a case where the asset in another account, such as an account for which a private key is lost, is retrieved by a block chain account. The device can implement the block chain-based asset processing method according to any embodiment of the application. The device 700 may include:

- a voting module 710 configured for starting a voting on whether a target account is an account to be retrieved, in response to an asset retrieval transaction request of the target account for the account to be retrieved;
- an identity authentication module 720 configured for performing an identity authentication on the target account, according to the votes of one or more target participants of one or more historical transactions initiated by the account to be retrieved; and
- an asset processing module 730 configured for processing the assets of the account to be retrieved according to the identity authentication result of the target account.

Optionally, the identity authentication module 720 may include:

- a participant determination unit 7201 configured for determining one or more target participants of one or more historical transactions initiated by the account to be retrieved, according to the historical transaction data stored in the block chain;
- a vote verification unit 7202 configured for performing a voting content verification on the votes of the target participants to determine a target vote whose voting content is verified as valid; and
- an identity authentication unit 7203 configured for performing an identity authentication on the target account according to the target vote.

Optionally, the vote verification unit 7202 may be configured for:

- obtaining a first hash value generated by the target participant based on a vote option and a random number;
- if the arrival of a voting time limit is monitored, obtaining the vote option and the random number published in a block chain network by a target participant;
- generating a second hash value according to the vote option and the random number published in the block chain network by the target participant; and
- determining the vote with the same first hash value and the same second hash value as a target vote whose voting content is verified as valid.

Optionally, the identity authentication unit 7203 may be configured for:

- determining the weight of each target participant, according to the historical transaction processing time of each of the respective target participants and the account to be retrieved;
- determining an identity approval score and an identity disapproval score, according to the vote options in the target votes and the weights of the target participants; and
- determining the identity authentication result of the target account according to the identity approval score, the identity disapproval score and a lowest score set for voting.

Optionally, the identity authentication unit 7203 may be configured for:

- if it is detected that the identity approval score is greater than the identity disapproval score and the identity approval score is greater than the lowest score, determining that the identity authentication result is approval of the target account being the account to be retrieved;
- if it is detected that the identity approval score is less than the identity disapproval score and the identity disapproval score is greater than the lowest score, determining that the identity authentication result is disapproval of the target account being the account to be retrieved; and
- if it is detected that the larger one of the identity approval score and the identity disapproval score is less than the lowest score, determining that the identity authentication result is inconclusive.

Optionally, the asset processing module 730 may be configured for:

- if the identity authentication result is approval of the target account being the account to be retrieved, transferring the assets of the account to be retrieved to the target account.

Further, the device 700 also includes an asset freezing module 740 configured for:

- before the voting on whether the target account is the account to be retrieved is started, transferring a preset amount of assets in the target account to a contract account to freeze the preset amount of the assets.

Further, the device 700 also includes an asset awarding module 750 configured for:

- after the assets of the account to be retrieved are processed according to the identity authentication result of the target account, performing an asset award distribution on the target participants to which the votes with the voting contents verified to be valid belong based on the frozen assets of the target account and according to the weights of the target participants.

Further, the device 700 further includes an identity intervention module 760 configured for:

- after the voting on whether the target account is the account to be retrieved is started, if it is detected that an identity declaration transaction of an intervention account associated with the account to be retrieved exists in the block chain network, performing authentication on a signature of the intervention account, according to a public key of the account to be retrieved;
- if the signature authentication of the intervention account is successful, determining that the intervention account is the owner of the account to be retrieved; and
- terminating the voting on whether the target account is the account to be retrieved.

According to the technical solution of the embodiment, the functions of responding to the asset retrieval transaction request, freezing the asset, starting the voting process, determining the voters, verifying the voting contents, authenticating the identity, transferring the assets, asset awarding and the like are realized by the mutual cooperation among the functional components. According to the embodiment of the present application, an account with a historical transaction processing relationship with the account to be retrieved is used for carrying out an identity authentication on the target account in a voting mode, so that the identity validity of the account is performed with a de-centralized authentication in a block chain network, the retrieval of the assets in the account based on the block chain network is facilitated when the private key of the account is lost, and the credibility, the usability, the authentication efficiency and the accuracy rate of the identity authentication are improved during the asset retrieval.

According to an embodiment of the present application, the present application also provides an electronic apparatus and a readable storage medium.

Figure 8:
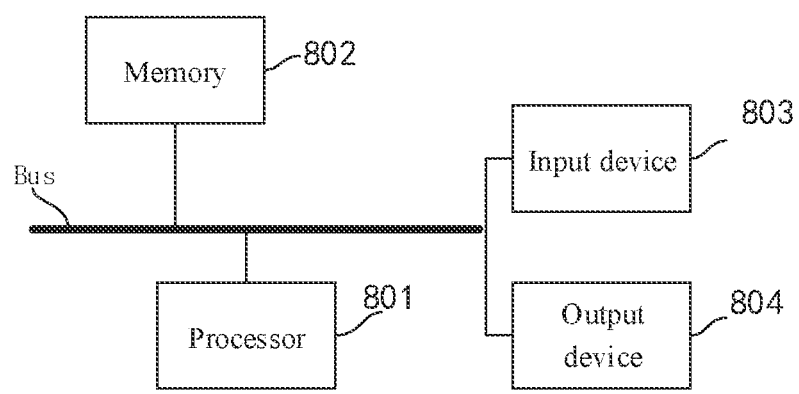
FIG. 8 is a block diagram of electronic apparatus configured to implement the block chain-based asset processing method of an embodiment of the present application.

FIG. 8 is a block diagram of the electronic apparatus for a block chain-based asset processing method according to an embodiment of the present application. The electronic apparatus is intended to represent various forms of digital computers, such as laptop computers, desktop computers, workstations, personal digital assistants, servers, blade servers, mainframe computers, and other suitable computers. The electronic apparatus may also represent various forms of mobile devices, such as Personal Digital Assistant, cellular telephones, smart phones, wearable devices, and other similar computing devices. The components shown herein, their connections and relationships, and their functions are by way of example only and are not intended to limit the implementations of the application described and/or claimed herein.

As shown in FIG. 8, the electronic apparatus includes one or more processors 801, a memory 802, and interfaces for connecting components, including high-speed interfaces and low-speed interfaces. The various components are interconnected by different buses and may be mounted on a common main-board or otherwise as desired. The processor may process instructions for execution within the electronic apparatus, including instructions stored in or on the memory to display graphical information of a graphical user interface (GUI) on an external input/output device, such as a display device coupled to the interface. In other implementations, multiple processors and/or buses may be used with multiple memories, if desired. Also, multiple electronic apparatus may be connected, each providing some of the necessary operations (e.g., as an array of servers, a set of blade servers, or a multiprocessor system). An example of a processor 801 is shown in FIG. 8.

A memory 802 is a non-transitory computer-readable storage medium provided herein. The memory stores instructions executable by at least one processor to cause the at least one processor to perform the block chain-based asset processing method provided herein. The non-transitory computer-readable storage medium of the present application stores computer instructions for enabling the computer to perform the block chain-based asset processing method provided herein.

The memory 802, as a non-transitory computer-readable storage medium, may be used to store non-transitory software programs, non-transitory computer-executable programs, and modules, such as program instructions/modules corresponding to the block chain-based asset processing method in embodiments of the present application (e.g., a voting module 710, an identity authentication module 720, an asset processing module 730, an asset freezing module 740, an asset awarding module 750, and identity intervention module 760 shown in FIG. 7). The processor 801 executes various functional applications of the server and data processing by running non-transient software programs, instructions, and modules stored in the memory 802, i.e., implementing the block chain-based asset processing method in the method embodiment described above.

The memory 802 may include a storage program area and a storage data area, wherein the storage program area may store an operating system, and an application program required for at least one function; and the storage data area may store data created according to the use of the electronic apparatus for the block chain-based asset processing method, etc. In addition, the memory 802 may include a high speed random access memory, and may also include a non-transitory memory, such as at least one disk storage device, a flash memory device, or other non-transitory solid state storage devices. In some embodiments, the memory 802 optionally includes a memory remotely located with respect to the processor 801, which may be connected via a network to the electronic apparatus for the block chain-based asset processing method. Examples of such networks include, but are not limited to, Internet, intranets, local area networks, mobile communication networks, and combinations thereof.

The electronic apparatus for the block chain-based asset processing method may further include an input device 803 and an output device 804. The processor 801, the memory 802, the input device 803, and the output device 804 may be connected by a bus or other means, exemplified by a bus connection in FIG. 8.

The input device 803 may receive input digital or character information and generate key signal inputs related to user settings and functional controls of electronic apparatus for the block chain-based asset processing method, such as a touch screen, a keypad, a mouse, a track pad, a touch pad, a pointer stick, one or more mouse buttons, a track ball, a joystick, and other input devices. The output device 804 may include a display device, an auxiliary lighting device (e.g., a Light Emitting Diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an Application Specific Integrated Circuit (ASIC), a computer hardware, a firmware, a software, and/or a combination thereof. These various implementations may include an implementation in one or more computer programs, which can be executed and/or interpreted on a programmable system including at least one programmable processor; the programmable processor can be a dedicated or general-purpose programmable processor, which can receive data and instructions from, and transmit data and instructions to, a memory system, at least one input device, and at least one output device.

These computing programs (also referred to as programs, softwares, software applications, or code) include machine instructions of a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

To provide an interaction with a user, the systems and techniques described herein may be implemented on a computer having a display device (for example, a cathode ray tube (CRT) or an LCD monitor) for displaying information to the user; and a keyboard and a pointing device (e.g., a mouse or a trackball) through which a user can provide input to the computer. Other types of devices may also be used to provide an interaction with a user. For example, the feedback provided to the user may be any form of sensory feedback (e.g., visual feedback, auditory feedback, or tactile feedback); and the inputs from the user may be received in any form, including acoustic input, voice input, or tactile input.

The systems and techniques described herein may be implemented in a computing system (e.g., as a data server) that includes a background component, or a computing system (e.g., an application server) that includes a middleware component, or a computing system (e.g., a user computer having a graphical user interface or a web browser through which a user may interact with embodiments of the systems and techniques described herein) that includes a front-end component, or a computing system that includes any combination of such background components, middleware components, or front-end components. The components of the system may be interconnected by any form or medium of digital data communication (e.g., a communication network). Examples of communication networks include Local Area Network (LAN), Wide Area Network (WAN), Internet and Block Chain Network.

The computer system may include a client and a server. The client and the server are typically remote from each other and typically interact via the communication network. The relationship of the client and the server is generated by computer programs running on respective computers and having a client-server relationship with each other.

According to the technical solution of an embodiment of the application, the account with the historical transaction processing relationship with the account to be retrieved is used for carrying out an identity authentication on the target account in a voting mode, so that the identity validity of the account is performed with a de-centralized authentication in a block chain network, the retrieval of the assets in the account based on the block chain network is facilitated when the private key of the account is lost, and the public credibility, the usability, the authentication efficiency and the accuracy rate of the identity authentication are improved during the asset retrieval.

In addition, one embodiment of the above application has the following advantages or benefits: by verifying the voting content of a target participant and carrying out the identity authentication based on the votes verified to be valid, a target participant is prevented from following other voting content for benefits, the truth and reliability of the voting content is guaranteed, and the accuracy of identity authentication is further improved.

In addition, one embodiment of the above application has the following advantages or benefits. Due to the fact that the target participant performs voting by using the first hash value, the voting content is unknown by others. When the voting content cannot be modified, i.e., the voting is finished, the number of votes is counted according to the voting contents published by the target participants. In order to prevent the target participants from modifying the voting contents according to the voting content of other accounts when publishing a voting content, the truth and reliability of a voting content is guaranteed by recalculating and comparing the hash value of the voting content.

In addition, one embodiment of the above application has the following advantages or benefits. As the closer the historical transaction is to the current time, the clearer the identity information that the target participant knows about the account to be retrieved and the more it is consistent with the current actual situation, different weights can be set for different target participants according to the historical transaction processing time. Therefore, voting statistics is carried out based on the weights and the vote options, so that the contributions of different target participants to the identity authentication are different, thereby the accuracy of voting statistics is improved, and the accuracy of identity authentication is further enhanced.

In addition, one embodiment of the above application has the following advantages or benefits. By setting the lowest score, the inaccuracy of voting statistics caused by insufficient number of target participants is prevented, the accuracy of voting statistics is improved, and the accuracy of identity authentication is further increased.

In addition, one embodiment of the above application has the following advantages or benefits. When the target account is authenticated to be the owner of the account to be retrieved, all assets in the account to be retrieved are transferred to the target account, the account to be retrieved with the lost private key is retrieved, and the security and traceability of the assets in the account to be retrieved are guaranteed.

In addition, one embodiment of the above application has the following advantages or benefits. By carrying out asset freezing on the target account, the target account pays a certain cost for asset retrieval, any arbitrary retrieval of assets by malicious accounts is avoided, and the security of asset retrieval is improved. Meanwhile, an asset award distribution can be used for voters with valid voting so as to encourage the accounts in the block chain network to actively monitor and participate in the voting, and encourage the accounts in the block chain network to carry out a true and valid voting.

In addition, one embodiment of the above application has the following advantages or benefits. On the basis of the frozen assets of the target account, the asset award distribution is carried out on the target participants to which the votes with the voting contents verified to be valid belong, so that the target account pays a certain cost for the retrieval of the assets, any arbitrary retrieval of the assets by a malicious account is avoided, the tracking of the voting process by the block chain account and the correct voting of the target account are stimulated, and the accuracy of identity authentication is improved.

In addition, one embodiment of the above application has the following advantages or benefits. The real owner of the account to be retrieved is identified in the voting process by performing the signature authentication on the intervention account initiating the identity declaration transaction, so that the asset stealing behavior of a malicious account is timely terminated, and the security of the account to be retrieved is guaranteed.

It will be appreciated that the various forms of flow shown above may be used, but with reordered, added or removed steps. For example, the steps recited in the present application may be performed in parallel or sequentially or may be performed in a different order, so long as the desired results of the technical solutions disclosed in the present application can be achieved, and no limitation is made herein.

The above-described embodiments are not to be construed as limiting the scope of the present application. It will be apparent to those skilled in the art that various modifications, combinations, sub-combinations and substitutions are possible, depending on design requirements and other factors. Any modifications, equivalents, and improvements within the spirit and principles of this application are intended to be included within the scope of this application.

What is claimed is:

1. A block chain-based asset processing method, applied to an electronic apparatus deployed with an asset retrieval intelligent contract having at least one processor and a memory, comprising:
   starting a voting on whether a target account is an account to be retrieved, in response to an asset retrieval transaction request of the target account for the account to be retrieved when a private key of the account to be retrieved is lost;
   performing an identity authentication on the target account, according to the votes of one or more target participants participating in one or more historical transactions initiated by the account to be retrieved; and
   processing the assets of the account to be retrieved, according to a result of the identity authentication of the target account;
   wherein, the performing the identity authentication on the target account, according to the votes of one or more target participants participating in the one or more historical transactions initiated by the account to be retrieved, comprises:
      determining the one or more target participants of the one or more historical transactions initiated by the account to be retrieved, according to historical transaction data stored in the block chain;
      performing a voting content verification on the votes of the one or more target participants to determine one or more target votes whose voting contents are verified as valid; and
      performing an identity authentication on the target account, according to the one ore more target votes;
   wherein, the performing the voting content verification on the votes of the one or more target participants to determine one or more target votes whose voting contents are verified as valid, comprises:
      obtaining a first hash value, which is generated by a target participant, based on a vote option and a random number;
      in response to monitoring that a time limit for voting is reached, obtaining the vote option and the random number published in a block chain network by the target participant;
      generating a second hash value according to the vote option and the random number published in the block chain network by the target participant; and
      determining the vote whose first hash value and second hash value are the same, as a target vote whose voting content is verified as valid.

2. The method according to claim 1, wherein, the processing the assets of the account to be retrieved, according to the result of the identity authentication of the target account, comprises:
   if the result of the identity authentication is to approve the target account as the account to be retrieved, transferring the assets of the account to be retrieved to the target account.

3. The method according to claim 1, wherein, prior to the starting the voting on whether the target account is the account to be retrieved, the method further comprises:
   transferring a preset amount of assets of the target account to a contract account to make the preset amount of the assets frozen.

4. The method according to claim 3, wherein, after the processing the assets of the account to be retrieved, according to the result of the identity authentication of the target account, the method further comprises:
   performing, according to the weights of the respective target participants, an asset award distribution on the target participants to which the votes, whose voting contents are verified as valid, belong, based on frozen assets of the target account.

5. The method according to claim 1, wherein, after the starting the voting on whether the target account is the account to be retrieved, the method further comprises:
   if it is detected that, in a block chain network, there exists an identity declaration transaction of an intervention account associated with the account to be retrieved, authenticating a signature of the intervention account, according to a public key of the account to be retrieved;
   if the authenticating the signature of the intervention account is successful, determining that the intervention account is the owner of the account to be retrieved; and
   terminating the voting on whether the target account is the account to be retrieved.

6. A non-transitory computer-readable storage medium storing computer instructions, wherein, the computer instructions cause the computer to perform the block chain-based asset processing method according to claim 1.

7. The non-transitory computer-readable storage medium according to claim 6, wherein, the computer instructions cause the computer to further execute:
   determining the one or more target participants of the one or more historical transactions initiated by the account to be retrieved, according to historical transaction data stored in the block chain;
   performing a voting content verification on the votes of the one or more target participants to determine one or more target votes whose voting contents are verified as valid; and
performing an identity authentication on the target account, according to the one or more target votes.

8. The method according to claim 1, wherein, the performing the identity authentication on the target account, according to the one or more target votes, comprises:
   determining the weights of the respective target participants, according to a historical transaction processing time by each of the target participants and the account to be retrieved;
   determining an identity approval score and an identity disapproval score, according to the vote options in the respective target votes and the weights of the respective target participants; and
   determining a result of the identity authentication of the target account, according to the identity approval score, the identity disapproval score and a lowest score set for the voting.

9. The method according to claim 8, wherein, the determining the result of the identity authentication of the target account, according to the identity approval score, the identity disapproval score and the lowest score set for the voting, comprises:
   if it is detected that the identity approval score is greater than the identity disapproval score and the identity approval score is greater than the lowest score set for the voting, determining that the result of the identity authentication is to approve the target account as the account to be retrieved;
   if it is detected that the identity approval score is smaller than the identity disapproval score and the identity disapproval score is greater than the lowest score set for the voting, determining that the result of the identity authentication is to disapprove the target account as the account to be retrieved; and if it is detected that the larger one of the identity approval score and the identity disapproval score is less than the lowest score set for the voting, determining that the result of the identity authentication is inconclusive.

10. A block chain-based asset processing device, applied to an electronic apparatus deployed with an asset retrieval intelligent contract, comprising:
   a processor and a memory for storing one or more computer programs executable by the processor,
   wherein when executing at least one of the computer programs, the processor is configured to perform operations comprising:
   starting a voting on whether a target account is an account to be retrieved, in response to an asset retrieval transaction request of the target account for the account to be retrieved when a private key of the account to be retrieved is lost;
   performing an identity authentication on the target account, according to the votes of one or more target participants participating in one or more historical transactions initiated by the account to be retrieved; and
   processing the assets of the account to be retrieved, according to a result of the identity authentication of the target account,
   wherein, when executing at least one of the computer programs, the processor is configured to further perform operations comprising:
      determining the one or more target participants of the one or more historical transactions initiated by the account to be retrieved, according to historical transaction data stored in the block chain;
      performing a voting content verification on the votes of the one or more target participants to determine one or more target votes whose voting contents are verified as valid; and
      performing an identity authentication on the target account, according to the one ore more target votes;
   wherein, when executing at least one of the computer programs, the processor is configured to further perform operations comprising:
      obtaining a first hash value, which is generated by a target participant, based on a vote option and a random number;
      in response to monitoring that a time limit for voting is reached, obtaining the vote option and the random number published in a block chain network by the target participant;
      generating a second hash value according to the vote option and the random number published in the block chain network by the target participant; and
      determining the vote whose first hash value and second hash value are the same, as a target vote whose voting content is verified as valid.

11. The device according to claim 10, wherein, when executing at least one of the computer programs, the processor is configured to further perform operations comprising:
   if the result of the identity authentication is to approve the target account as the account to be retrieved, transferring the assets of the account to be retrieved to the target account.

12. The device according to claim 10, wherein, when executing at least one of the computer programs, the processor is configured to further perform operations comprising:
   prior to the starting the voting on whether the target account is the account to be retrieved, transferring a preset amount of assets of the target account to a contract account to make the preset amount of the assets frozen.

13. The device according to claim 12, wherein, when executing at least one of the computer programs, the processor is configured to further perform operations comprising:
   after processing the assets of the account to be retrieved according to the result of the identity authentication of the target account, performing, according to the weights of the respective target participants, an asset award distribution on the target participants to which the votes, whose voting contents are verified as valid, belong, based on frozen assets of the target account.

14. The device according to claim 10, wherein, when executing at least one of the computer programs, the processor is configured to further perform operations comprising:
   after starting the voting on whether the target account is the account to be retrieved, if it is detected that, in a block chain network, there exists an identity declaration transaction of an intervention account associated with the account to be retrieved, authenticating a signature of the intervention account, according to a public key of the account to be retrieved;
   if the authenticating the signature of the intervention account is successful, determining that the intervention account is the owner of the account to be retrieved; and
   terminating the voting on whether the target account is the account to be retrieved.

15. The device according to claim 10, wherein, when executing at least one of the computer programs, the processor is configured to further perform operations comprising:
   determining the weights of the respective target participants, according to a historical transaction processing time by each of the target participants and the account to be retrieved;
   determining an identity approval score and an identity disapproval score, according to the vote options in the respective target votes and the weights of the respective target participants; and
   determining a result of the identity authentication of the target account, according to the identity approval score, the identity disapproval score and a lowest score set for the voting.

16. The device according to claim 15, wherein, when executing at least one of the computer programs, the processor is configured to further perform operations comprising:
   if it is detected that the identity approval score is greater than the identity disapproval score and the identity approval score is greater than the lowest score set for the voting, determining that the result of the identity authentication is to approve the target account as the account to be retrieved;
   if it is detected that the identity approval score is smaller than the identity disapproval score and the identity disapproval score is greater than the lowest score set for the voting, determining that the result of the identity authentication is to disapprove the target account as the account to be retrieved; and
   if it is detected that the larger one of the identity approval score and the identity disapproval score is less than the lowest score set for the voting, determining that the result of the identity authentication is inconclusive.

* * * * *